(12) United States Patent
Li et al.

(10) Patent No.: US 10,885,659 B2
(45) Date of Patent: Jan. 5, 2021

(54) OBJECT POSE ESTIMATING METHOD AND APPARATUS

(71) Applicant: Samsung Electronics Co., Ltd., Suwon-si (KR)

(72) Inventors: Weiming Li, Beijing (CN); Yueying Kao, Beijing (CN); Dongdong Yu, Beijing (CN); Hao Wang, Beijing (CN); Minsu Ahn, Yongin-si (KR); Qiang Wang, Beijing (CN); Sunghoon Hong, Suwon-si (KR); Yang Liu, Beijing (CN); Zairan Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 16/161,243

(22) Filed: Oct. 16, 2018

(65) Prior Publication Data

US 2019/0220992 A1    Jul. 18, 2019

(30) Foreign Application Priority Data

Jan. 15, 2018  (CN) .......................... 2018 1 0036473
Jun. 19, 2018  (KR) ........................ 10-2018-0070334

(51) Int. Cl.
*G06T 7/00*     (2017.01)
*G06T 7/73*     (2017.01)
(Continued)

(52) U.S. Cl.
CPC ................ *G06T 7/73* (2017.01); *G06N 3/08* (2013.01); *G06T 7/11* (2017.01); *G06T 7/50* (2017.01);
(Continued)

(58) Field of Classification Search
CPC ..... G06T 7/55; G06T 7/50; G06T 7/11; G06T 7/60; G06T 2207/10004;
(Continued)

(56) References Cited

U.S. PATENT DOCUMENTS 6,097,854 A    8/2000   Szeliski et al.
8,610,723 B2   12/2013  Lee et al.
(Continued)

FOREIGN PATENT DOCUMENTS

EP          3 147 827 A1      3/2017
KR     10-2017-0000748 A      1/2017

OTHER PUBLICATIONS

Su, Hao, et al. "Render for CNN: Viewpoint Estimation in Images Using CNNs Trained with Rendered 3d Model Views", *Proceedings of the IEEE International Conference on Computer Vision*, 2015. pp. 2686-2694, (9 pages in English).

(Continued)

*Primary Examiner* — Ping Y Hsieh
(74) *Attorney, Agent, or Firm* — NSIP Law

(57) ABSTRACT

Disclosed is an object pose estimating method and apparatus. The pose estimating method includes acquiring a two-dimensional (2D) image corresponding to an object, extracting a global visual feature and a local geometric feature of the object in the 2D image, and estimating a three-dimensional (3D) pose of the object based on the global visual feature and the local geometric feature.

22 Claims, 8 Drawing Sheets

(51) Int. Cl.
*G06N 3/08* (2006.01)
*G06T 7/11* (2017.01)
*G06T 7/60* (2017.01)
*G06T 7/55* (2017.01)
*G06T 7/50* (2017.01)

(52) U.S. Cl.
CPC .................. *G06T 7/55* (2017.01); *G06T 7/60* (2013.01); *G06T 2207/10004* (2013.01); *G06T 2207/10016* (2013.01); *G06T 2207/10028* (2013.01); *G06T 2207/20081* (2013.01); *G06T 2207/20084* (2013.01)

(58) Field of Classification Search
CPC . G06T 2207/10016; G06T 2207/10028; G06T 2207/20081; G06T 2207/20084; G06N 3/08
See application file for complete search history.

(56) References Cited

U.S. PATENT DOCUMENTS

| 8,711,206 | B2 | 4/2014 | Newcombe et al. |
| 8,912,978 | B2 | 12/2014 | Szczerba et al. |
| 9,633,306 | B2 | 4/2017 | Liu et al. |
| 2008/0298643 | A1 | 12/2008 | Lawther et al. |
| 2018/0144458 | A1* | 5/2018 | Xu ........................ H04N 13/239 |
| 2018/0336434 | A1* | 11/2018 | Kicanaoglu ............... G06T 7/74 |
| 2019/0012802 | A1* | 1/2019 | Liu ........................... G06T 7/73 |
| 2019/0114824 | A1* | 4/2019 | Martinez .................. G06T 7/55 |
| 2019/0139179 | A1* | 5/2019 | Wang ...................... G06T 7/579 |

OTHER PUBLICATIONS

Xiang, Yu, et al. "ObjectNet3D: A Large Scale Database for 3D Object Recognition", *European Conference on Computer Vision*, Springer, Cham, 2016 0(16 pages in English).

* cited by examiner

OBJECT POSE ESTIMATING METHOD AND APPARATUS

CROSS-REFERENCE TO RELATED APPLICATIONS

This application claims the benefit under 35 USC § 119(a) of Chinese Patent Application No. 201810036473.5, filed on Jan. 15, 2018, in the Chinese Patent Office, and Korean Patent Application No. 10-2018-0070334, filed on Jun. 19, 2018, in the Korean Intellectual Property Office, the entire disclosures all of which are incorporated herein by reference for all purposes.

BACKGROUND

1. Field

The following description relates to a method and apparatus for estimating a pose of an object.

2. Description of Related Art

In an augmented reality environment, a dense depth image is used to verify a position of virtual content and how the content is represented. Through this, more realistic augmented reality can be provided to users.

Density refers to a depth estimation value of each pixel of an object image region. One method of acquiring a dense depth image is to acquire a dense depth image using a specific sensor, for example, a depth sensor. This method has a limitation in that a special hardware sensor is required, and energy consumption is required for configuring the light source necessary for depth measurement, which reduces time of use of facilities.

Further, the configured light source is incapable of flashing light at a distant object and affected by a strong ray, for example, from the sun, and thus the method of using the specific sensor is applicable only to an indoor environment and has a limitation to an environment of use.

Another method of acquiring a dense depth image is to use a moving camera to acquire multiple images. Image information captured from various angles is fused and used to calculate a depth image.

Since such technology requires actions of a user and thus, causes inconvenience to the user, the experience rate of users is low. Due to such issues, an improved method that may promote convenient acquisition of a dense depth image is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a pose estimating method includes acquiring a two-dimensional (2D) image corresponding to an object, extracting a global visual feature and a local geometric feature of the object in the 2D image, and estimating a three-dimensional (3D) pose of the object based on the global visual feature and the local geometric feature.

The global visual feature may refer to a visual feature of the object in its entirety and the local geometric feature may refer to a geometric feature of a portion of the object.

The other portion of the object in the geometric feature may be occluded or truncated.

The acquiring may include acquiring the 2D image by performing object region segmentation on an image.

The local geometric feature may include a local key component of the object or a key point of the object.

The extracting may include extracting the global visual feature of the 2D image through a first deep learning network, and extracting the local geometric feature of the 2D image through a second deep learning network.

The extracting of the global visual feature through the first deep learning network may include training a third deep learning network based on the 2D image and depth information of the 2D image, and applying a feature approximation strategy to the first deep learning network based on the 2D image and an output of the third deep learning network.

The applying may include calculating a loss term which is a difference between a feature obtained from the first deep learning network and a feature obtained from the third deep learning network, and approximating the feature obtained from the first deep learning network to the feature obtained from the third deep learning network based on the loss term.

The extracting of the local geometric feature through the second deep learning network may include training a fourth deep learning network based on the 2D image and pixel information of the 2D image, and applying a feature approximation strategy to the second deep learning network based on the 2D image and an output of the fourth deep learning network.

The applying may include calculating a loss term which is a difference between a feature obtained from the second deep learning network and a feature obtained from the fourth deep learning network, and approximating the feature obtained from the second deep learning network to the feature obtained from the fourth deep learning network based on the loss term.

In another general aspect, a depth image generating method includes acquiring dense depth images corresponding to a plurality of objects based on the 3D pose estimated by the pose estimating method, and generating a dense depth value of the 2D image by integrating the dense depth images.

In still another general aspect, a pose estimating apparatus includes a receiver configured to receive an image, and a controller configured to acquire a 2D image corresponding to an object from the image, extract a global visual feature and a local geometric feature of the object in the 2D image, and estimate a 3D pose of the object based on the global visual feature and the local geometric feature.

The global visual feature may refer to a visual feature of the object in its entirety and the local geometric feature may refer to a geometric feature of a portion of the object.

The other portion of the object in the geometric feature may be occluded or truncated.

The controller may be further configured to acquire the 2D image by performing object region segmentation on the image.

The local geometric feature may include a local key component of the object or a key point of the object.

The controller may be further configured to extract the global visual feature of the 2D image through a first deep learning network, and extract the local geometric feature of the 2D image through a second deep learning network.

The controller may be further configured to train a third deep learning network based on the 2D image and depth information of the 2D image, and apply a feature approximation strategy to the first deep learning network based on the 2D image and an output of the third deep learning network.

The controller may be further configured to calculate a loss term which is a difference between a feature obtained from the first deep learning network and a feature obtained from the third deep learning network, and approximate the feature obtained from the first deep learning network to the feature obtained from the third deep learning network based on the loss term.

The controller may be further configured to train a fourth deep learning network based on the 2D image and pixel information of the 2D image, and apply a feature approximation strategy to the second deep learning network based on the 2D image and an output of the fourth deep learning network.

The controller may be further configured to calculate a loss term which is a difference between a feature obtained from the second deep learning network and a feature obtained from the fourth deep learning network, and approximate the feature obtained from the second deep learning network to the feature obtained from the fourth deep learning network based on the loss term.

The pose estimating apparatus may further include a depth image generator configured to acquire dense depth images corresponding to a plurality of objects based on the 3D pose, and generate a dense depth value of the image by integrating the dense depth images.

Other features and aspects will be apparent from the following detailed description, the drawings, and the claims.

Figure 1:
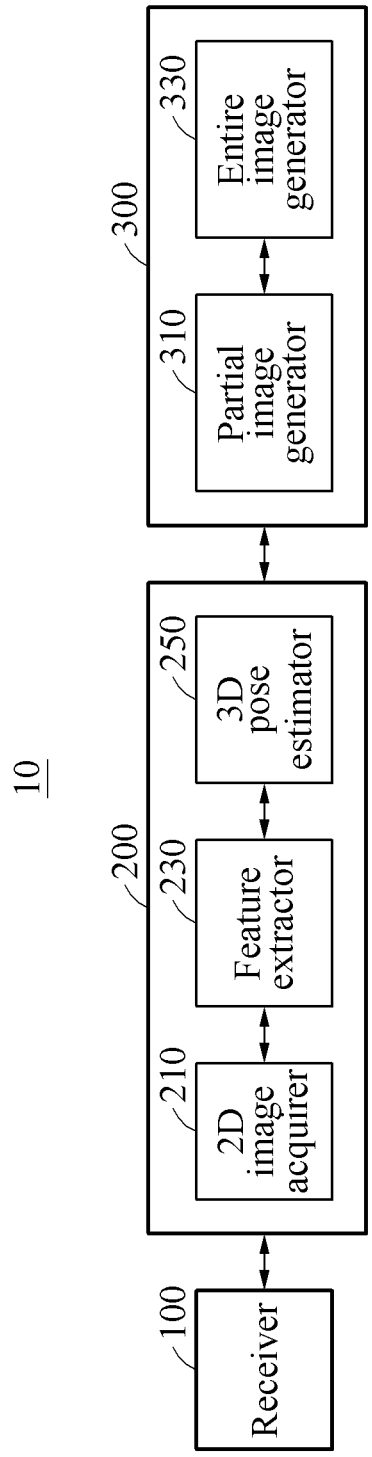
FIG. 1 is a block diagram illustrating an example of a pose estimating apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure.

FIG. 1 is a block diagram illustrating an example of a pose estimating apparatus.

Referring to FIG. 1, a pose estimating apparatus 10 receives (or acquires) a single two-dimensional (2D) image, without requiring a specific sensor or multiple images, and estimates a three-dimensional (3D) pose of an object from the 2D image. Then, the pose estimating apparatus 10 acquires a dense depth image based on the 3D pose of the object.

The estimation of the 3D pose of the object is to calculate information of the object at six degrees of freedom (6DOF) about a camera or a person and is divided into a translation matrix T and a rotation matrix R. The 6DOF includes an azimuth a, an elevation angle e, an angle of rotation θ, a depth d, and the origin (u, v) of the object. In the 6DOF, the azimuth a, the elevation angle e, the angle of rotation θ, and the depth d constitute the translation matrix T. The translation matrix and the rotation matrix are external parameters of the camera, and the origin (u, v) of the object, a focal distance f, and a window size a are internal parameters of the camera.

There are several difficulties in estimating the 3D pose of the object from the single 2D image. For example, images of the same object may show an extremely great visual difference (for example, a front view and a rear view of the same chair are totally different views). In addition, an object may be occluded by another object in an image, and only a portion of an object may be included in an image (for example, the object is truncated in the image).

By solving the issue described above, the pose estimating apparatus 10 obtains a more accurate 3D pose of an object, thereby further satisfying a demand for augmented reality (AR) and acquiring a dense depth image.

The pose estimating apparatus 10 includes a receiver 100 and a controller 200. The receiver 100 acquires an image. For example, the image acquired by the receiver 100 includes at least one object including an object of which a 3D pose is to be estimated, and the 3D pose is to be estimated for at least one object.

The controller 200 obtains the 3D pose of the object through image feature extraction with respect to a 2D image corresponding to the object of which a 3D pose is to be estimated. The controller 200 includes a 2D image acquirer 210, a feature extractor 230, and a 3D pose estimator 250.

The 2D image acquirer 210 acquires the 2D image corresponding to the object from the image acquired by the receiver 100. For example, the 2D image acquirer 210 acquires the 2D image corresponding to the object of which a 3D pose is to be estimated by performing object region segmentation on the image. The 2D image is a color image or a monochrome image.

The feature extractor 230 extracts an image feature of the object from the 2D image. The image feature of the object includes a global visual feature and/or a local geometric feature.

The 3D pose estimator 250 estimates the 3D pose of the object based on the extracted image feature. For example, the 3D pose estimator 250 obtains the 3D pose of the object based on either one or both of the global visual feature and the local geometric feature.

The global visual feature refers to a visual feature of the entire object, the feature extracted from the entire image, for example, the color image or the monochrome image, and represents an overall characteristic of the object.

The local geometric feature refers to a geometric feature of a portion of the object and represents a feature of a key point or a key component of the portion of the object. For example, an automobile includes components such as a left-front wheel, a right-front wheel, a left-rear wheel, a right-rear wheel, headlights and doors. The local geometric feature distinguishes a difference of the object when the object is occluded or truncated.

In an actual image, an object has greatly different poses. In a case in which the object is occluded or truncated in the image, the overall visual feature does not represent a feature of a portion of the object, whereas the feature of the portion of the object reflects a pose of the object more accurately. In this example, a geometric feature of the portion of the object becomes more dynamic, thereby more efficiently increasing the accuracy of object pose estimation.

When the pose is estimated by combining the visual feature of the entire object and the geometric feature of the portion of the object, both features of the entire object and features of the portion of the object are reflected. By combining the two types of features, more dynamic and more distinct features are obtained, thereby increasing the accuracy of 3D pose estimation.

The pose estimating apparatus 10 further includes a depth image generator 300. The depth image generator 300 acquires a dense depth image based on the estimated 3D pose. Although FIG. 1 illustrates the depth image generator 300 implemented in the pose estimating apparatus 10, examples are not limited thereto. The depth image generator 300 may be implemented as a separate device which is distinct from the pose estimating apparatus 10.

The depth image generator 300 includes a partial image generator 310 and an entire image generator 330.

The partial image generator 310 acquires a dense depth image corresponding to each object based on an estimated 3D pose of each object. For example, the dense depth image acquired by the partial image generator 310 is a depth image with respect to a 2D image corresponding to the object.

The entire image generator 330 acquires a dense depth image corresponding to an image including each object (for example, the entire 2D image), based on the dense depth image corresponding to each object.

Figure 2:
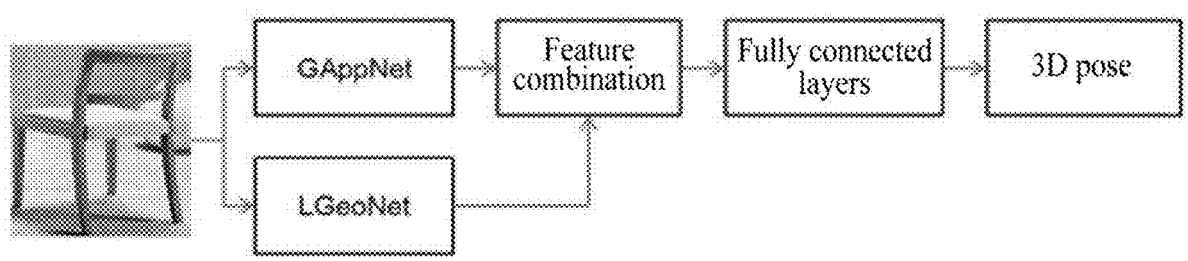
FIG. 2 illustrates an example of an operation of a pose estimating apparatus.

FIG. 2 illustrates an example of an operation of a pose estimating apparatus.

Referring to FIG. 2, the controller 200 extracts an image feature of an object from a 2D image corresponding to the object through deep learning and obtains a 3D pose of the object based on the extracted image feature.

The controller 200 includes a structure of a deep learning network. The deep learning network is trained or is not trained. The deep learning network includes an input layer, a hidden layer, and an output layer. For example, the deep learning network is a convolutional neural network (CNN).

2D image reception corresponds to the input layer, image feature extraction corresponds to the hidden layer, and 3D pose estimation corresponds to the output layer. A last layer of the hidden layer is a feature extraction layer which is a fully connected layer.

A global visual feature of the object is extracted from the 2D image through a first deep learning network. A local geometric feature of the object is extracted from the 2D image through a second deep learning network. For example, the first deep learning network is GAppNet, and the second deep learning network is LGeoNet.

Then, a feature combination is performed. For example, the global visual feature and the local geometric feature are combined into a final image feature f. The final image feature f is an input of a subsequent network.

The final image feature f is used as the input of the subsequent network. For example, the final image feature f is processed through at least one fully connected layer as the subsequent network.

The 3D pose of the object is output based on the final image feature f.

Figure 3:
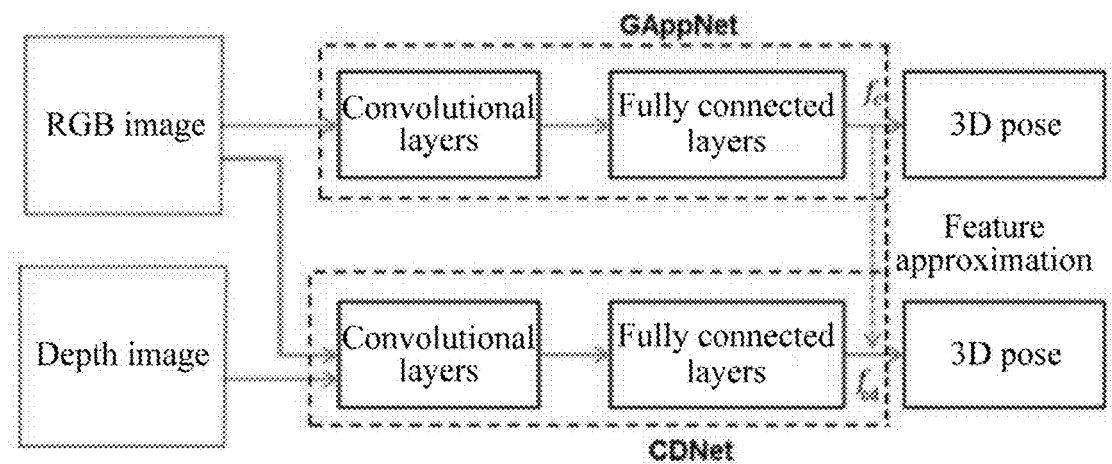
FIG. 3 illustrates an example of a deep learning network for estimating a three-dimensional (3D) pose of an object.

FIG. 3 illustrates an example of a deep learning network for estimating a 3D pose of an object.

FIG. 3 illustrates an example of a process of training a deep learning network that extracts a global visual feature. The global visual feature is extracted through a network model obtained by training of FIG. 3.

Referring to FIG. 3, a deep learning network CDNet is trained first. Input data includes a color (or monochrome channel) (for example, RGB image). Further, the input data includes a depth channel (for example, depth image). Here, image data related to an image of an object and corresponding depth data need to contain matching pose information.

The input data is processed through a convolutional layer and a fully connected layer, and a feature $f_{cd}$ is obtained. A plurality of convolutional layers and a plurality of fully connected layers are provided. The input data is processed further through an activation function layer (not shown) or a pooling layer (not shown) between the convolutional layer and the fully connected layer.

3D pose information of the object is output based on the feature $f_{cd}$. The 3D pose information of the object at the deep learning network CDNet is obtained using a network model $Model_{cd}$.

Next, a deep learning network GAppNet is trained. Input data includes a color (or monochrome) channel (for example, RGB image).

The input data is processed through a convolutional layer and a fully connected layer, and a feature $f_c$ is obtained. A plurality of convolutional layers and a plurality of fully connected layers are provided. The input data is processed further through an activation function layer (not shown) or a pooling layer (not shown) between the convolutional layer and the fully connected layer.

3D pose information of the object is output based on the feature $f_c$. The 3D pose information of the object at the deep learning network GAppNet is obtained using a network model $Model_{GApp}$.

A feature approximation strategy is applied to the process of training the deep learning network GAppNet. The feature approximation strategy is to enable a feature output from a network and a feature output from another network to be maximally matched. In the process of training the network GAppNet, the feature approximation strategy is to enable the feature obtained through the network model $Model_{GApp}$ to be maximally matched to the feature obtained through the network model $Model_{cd}$.

For example, when training the deep learning network GAppNet, the process of training the network GAppNet is enhanced using the already trained network model $Model_{cd}$ (supervise). That is, a single auxiliary loss term $loss_{cd}=f_c-f_{cd}$ is added to a loss function. In this way, the feature obtained through the network model $Model_{GApp}$ constantly approaches the feature obtained through the network model $Model_{cd}$. Since the network model $Model_{cd}$ uses both the color data and the depth data, the network model $Model_{GApp}$ is trained with the depth information after the auxiliary loss term $loss_{cd}$ is added, thereby achieving an enhanced distinctness and dynamic of the learned feature.

Figure 4:
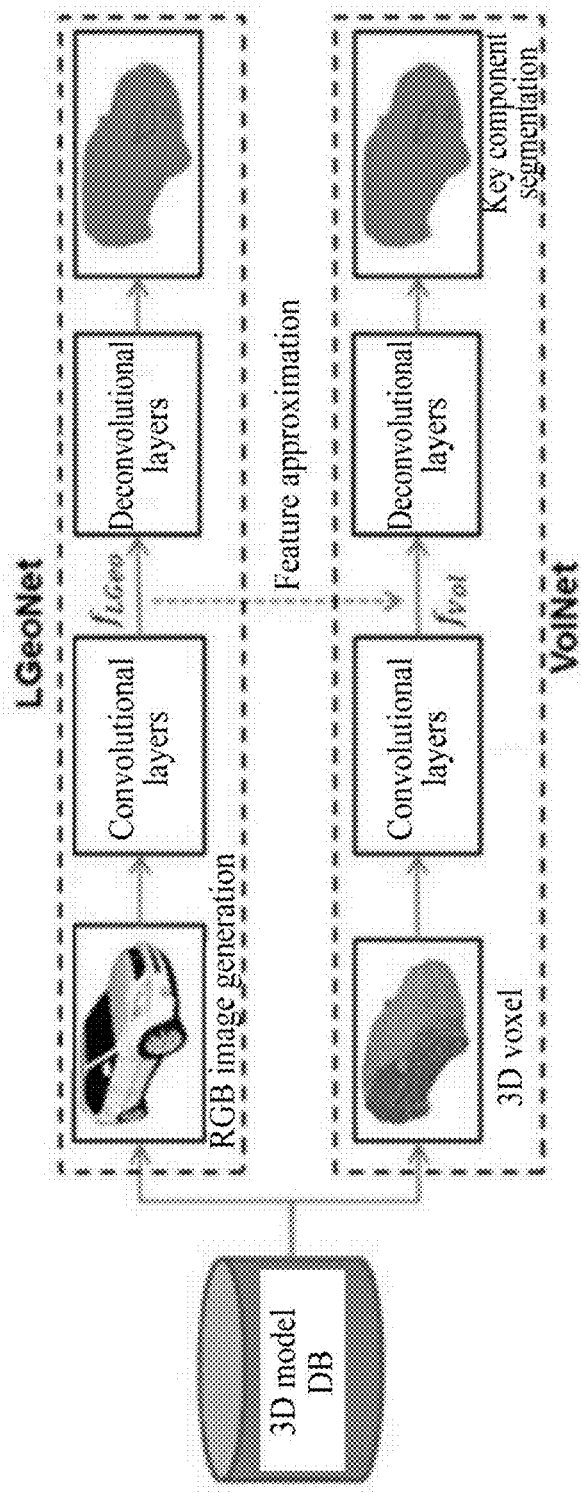
FIG. 4 illustrates an example of a deep learning network for estimating a 3D pose of an object.

FIG. 4 illustrates an example of a deep learning network for estimating a 3D pose of an object.

FIG. 4 illustrates an example of a process of training a deep learning network that extracts a local geometric feature. The local geometric feature is extracted through a network model obtained by training of FIG. 4.

Referring to FIG. 4, a deep learning network VolNet is trained first. Input data includes 3D voxel data generated (or stored) from a 3D model database. For example, the 3D voxel data is 3D depth data.

The input data is processed through a convolutional layer, and a feature $f_{vol}$ is obtained. A plurality of convolutional layers is provided. The input data is processed further through an activation function layer (not shown) or a pooling layer (not shown).

The feature $f_{vol}$ is processed through a deconvolutional layer, and key component information of an object is output. A plurality of deconvolutional layers is provided. The key component information of the object at the deep learning network VolNet is obtained using a network model $Model_{vol}$.

Next, a deep learning network LGeoNet is trained. Input data includes a color or monochrome image (for example, RGB image) generated (or stored) from the 3D model database. For example, 3D voxel data is 3D depth data.

The input data is processed through a convolutional layer, and a feature $f_{LGeo}$ is obtained. A plurality of convolutional layers is provided. The input data is processed further through an activation function layer (not shown) or a pooling layer (not shown).

The feature $f_{LGeo}$ is processed through a deconvolutional layer, and key component information of an object is output. A plurality of deconvolutional layers is provided. The key component information of the object at the deep learning network LGeoNet is obtained using a network model $Model_{LGeo}$.

A feature approximation strategy is also used for the process of training the deep learning network LGeoNet. That is, by referring to the already trained network model $Model_{vol}$, the feature approximation strategy enables the feature obtained by the network model $Model_{LGeo}$ to be maximally matched to the feature obtained by the network model $Model_{vol}$.

For example, when training the deep learning network LGeoNet, the process of training the deep learning network LGeoNet is enhanced using the already trained network model $Model_{vol}$. That is, a single auxiliary loss term $loss_{LGeo}=f_{LGeo}-f_{vol}$ is added to a loss function. In this way, the feature obtained through the network model $Model_{LGeo}$ constantly approaches the feature obtained through the network model $Model_{vol}$. Since the network model $Model_{vol}$ uses the 3D voxel data which is 3D depth data, the network model $Model_{LGeo}$ is trained with depth information after the auxiliary loss term $loss_{LGeo}$ is added, thereby having an enhanced capability of expressing a geometric feature of a portion of an object.

As described with reference to FIGS. 3 and 4, when a 2D image of an object is input, the controller 200 extracts a global visual feature and/or a local geometric feature through the network model $Model_{GApp}$ and the network model $Model_{LGeo}$ which are already trained. Then, the controller 200 estimates a 3D pose of the object based on the global visual feature and/or the local geometric feature.

That is, the pose estimating apparatus 10 classifies the pose of the object based on a CNN or regresses. Input data includes a color image (or color channel), a depth image (or depth channel), and 3D voxel data (or 3D depth data), and a capability of expressing a feature of the color image is enhanced through the feature approximation strategy.

The CNN structure includes various types of models. Hereinafter, an example of a network VGG16 will be described. VGG16 includes 16 hidden layers. Among the hidden layers, the first 13 layers are convolutional layers, and the last 3 layers are fully connected layers. Further, each convolutional layer is followed by a single activation function layer (not shown) and a single pooling layer (not shown), and the first two fully connected layers each are followed by a single activation function layer (not shown) and a dropout layer (not shown). The last fully connected layer is an output layer, and outputs the estimated 3D pose of the object.

Figure 5:
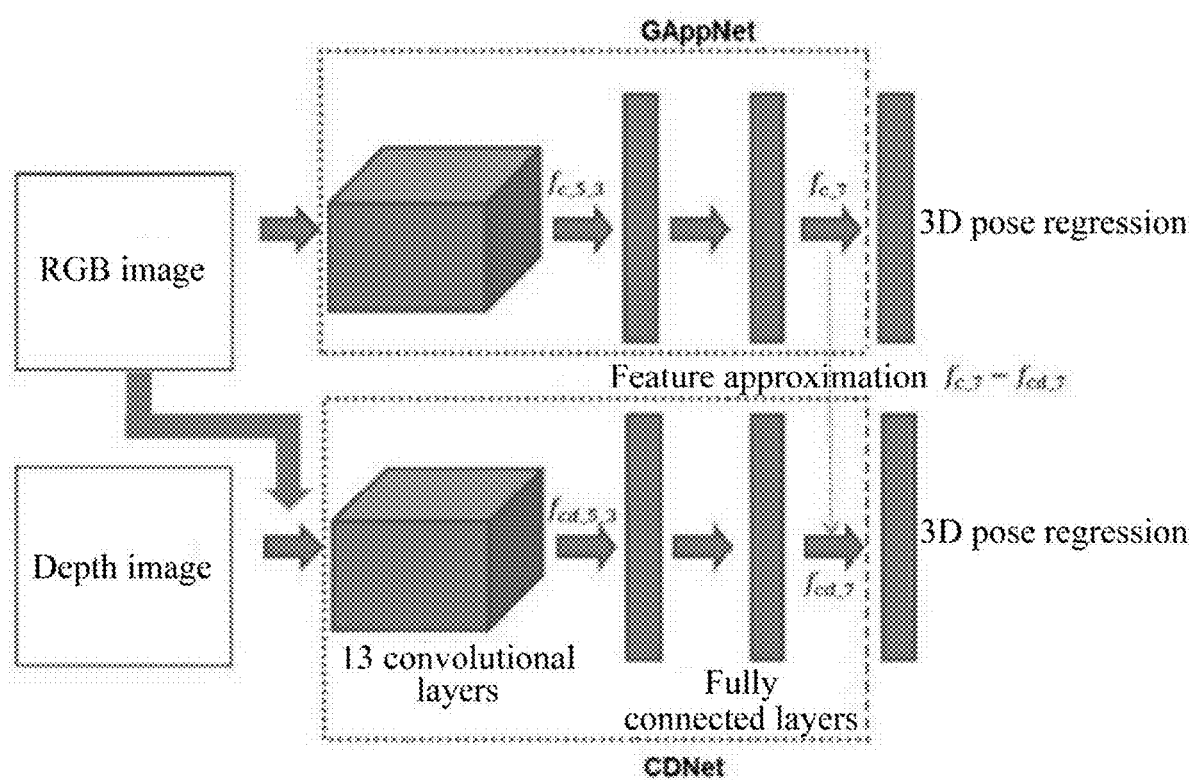
FIG. 5 illustrates an example of a deep learning network for estimating a 3D pose of an object.

FIG. 5 illustrates an example of a deep learning network for estimating a 3D pose of an object.

FIG. 5 illustrates another example of a process of training a deep learning network that extracts a global visual feature. The global visual feature is extracted through a network model obtained by training of FIG. 5.

Referring to FIG. 5, a deep learning network CDNet is trained first. Input data includes color data (e.g., RGB data) and depth data of an image.

The input data is processed through convolutional layers, e.g., 13 convolution layers where a 13-layer convolution operation is performed on the input data; however, the number of convolution layers is not limited thereto. Through this, a convolutional feature $f_{cd\_5\_3}$ of the image is obtained.

In this example, the size of the input data is [64, 4, 224, 224], where 64 denotes the batch size; 4 denotes the number of channels including a red channel, a green channel, a blue channel, and a depth channel; and each of the 224s denotes the height and the width of the input image, respectively.

The size of the convolutional kernel is 3×3, for example, where the step size is set to "1" and an edge expansion value is "1". A convolution operation is performed on the convolutional kernel and the input data, and the number of output channels corresponds to a number of neurons of a current convolutional kernel. Since edge expansion was performed, the convolution operation does not change the size of the feature map.

The feature map, on which the convolution operation is performed, is processed by a Rectified Linear Unit (ReLU) function, which is a non-linear activation function. The function for calculating the ReLU function is max(0,x). When the ReLU function is used, the calculation count of error gradient that occurs during backward propagation is reduced, a sparse row of a network is added, and mutual dependency of parameters is weakened, whereby an overfitting issue is alleviated. Overfitting describes a situation in which a model learns the details and noise in a training data to the extent that it negatively impacts the performance of the model on new data. A ReLU layer neither changes the size of the feature map nor changes the number of feature maps.

The pooling layer is a downsampling layer, of which a pooling window size is set to 2×2, for example, and the pooling step length is set to "2". A non-overlapping maximum pooling operation is performed on the image. The pooling operation only changes the size of the feature map and does not change the number of feature maps. Each time a single pooling operation is performed, in this example, the size of the feature map is changed to a quarter of its original. Each time a second, fourth, seventh, tenth, or thirteenth convolution operation is performed, the pooling operation may be performed, and, when performed, the width and the height of the feature map on which a fifth pooling operation is performed are changed to those of a thirty-second of the input image.

A two-fully connected layer operation is performed on the feature $f_{cd\_5\_3}$, and an image feature (or feature map) $f_{cd\_7}$ is obtained. The feature map, on which the two-fully connected layer operation is performed, is processed through and by the ReLU function which is a non-linear activation function to perform the dropout operation. The probability of discarding data is set to "0.5". A main function of the dropout layer is to prevent or reduce an occurrence of overfitting in the neural network. The image feature $f_{cd\_7}$ may correspond to $f_{cd}$ of FIG. 3.

A single-fully connected layer operation is performed on the image feature $f_{cd\_7}$ again, and 3D pose information is output.

Next, a deep learning network GAppNet is trained where the input data is a color image.

A 13-layer convolution operation is performed on the input data (color image) and a convolutional feature $f_{c\_5\_3}$ of the image is obtained.

Here, the size of the input data, that is, the input image, is [64, 3, 224, 224], where 64 denotes the batch size; 4 denotes the number of channels including a red channel, a green channel, a blue channel, and a depth channel; and each of the 224s denote the height and the width of the input image, respectively.

The size of a convolutional kernel is 3×3, a step size is set to "1" and an edge expansion value is "1". A convolution operation is performed on the convolutional kernel and the input data, and the number of output channels correspond to the number of neurons of a current convolutional kernel.

The feature map on which the convolution operation is performed is processed by a ReLU function, which is a non-linear activation function. Each time a second, fourth, seventh, tenth, or thirteenth convolution operation is performed, the feature map is downsampled, and a pooling operation is set. A pooling window size is set to 2×2, in this example, and the pooling step length is set to "2". A non-overlapping maximum pooling operation is performed on the image.

A two-fully connected layer operation is performed on the feature $f_{c\_5\_3}$, and an image feature $f_{c\_7}$ is obtained. The feature map, on which the two-fully connected layer operation is performed, is processed by the ReLU function which is a non-linear activation function, and a dropout operation is performed thereon. A probability of discarding data is set to "0.5". The image feature $f_{c\_7}$ corresponds to $f_c$ of FIG. 3.

A single-fully connected layer operation is performed on the image feature $f_{c\_7}$ again, and 3D pose information is output.

A feature approximation strategy is also used for the process of training the deep learning network GAppNet. That is, the feature approximation strategy enables the image feature $f_{c\_7}$ obtained by the deep learning network GAppNet and the image feature $f_{cd\_7}$ obtained by the deep learning network CDNet to be maximally matched. By adding a single auxiliary loss term $loss_{cd} = f_{c\_78} - f_{cd\_7}$ to a loss function, the image feature $f_{c\_7}$ is enabled to constantly approach $f_{c\_7}$ when the network is trained. In the training process, parameters of the network model $Model_{cd}$ do not change and are only used to assist training of the deep learning network GAppNet.

Figure 6:
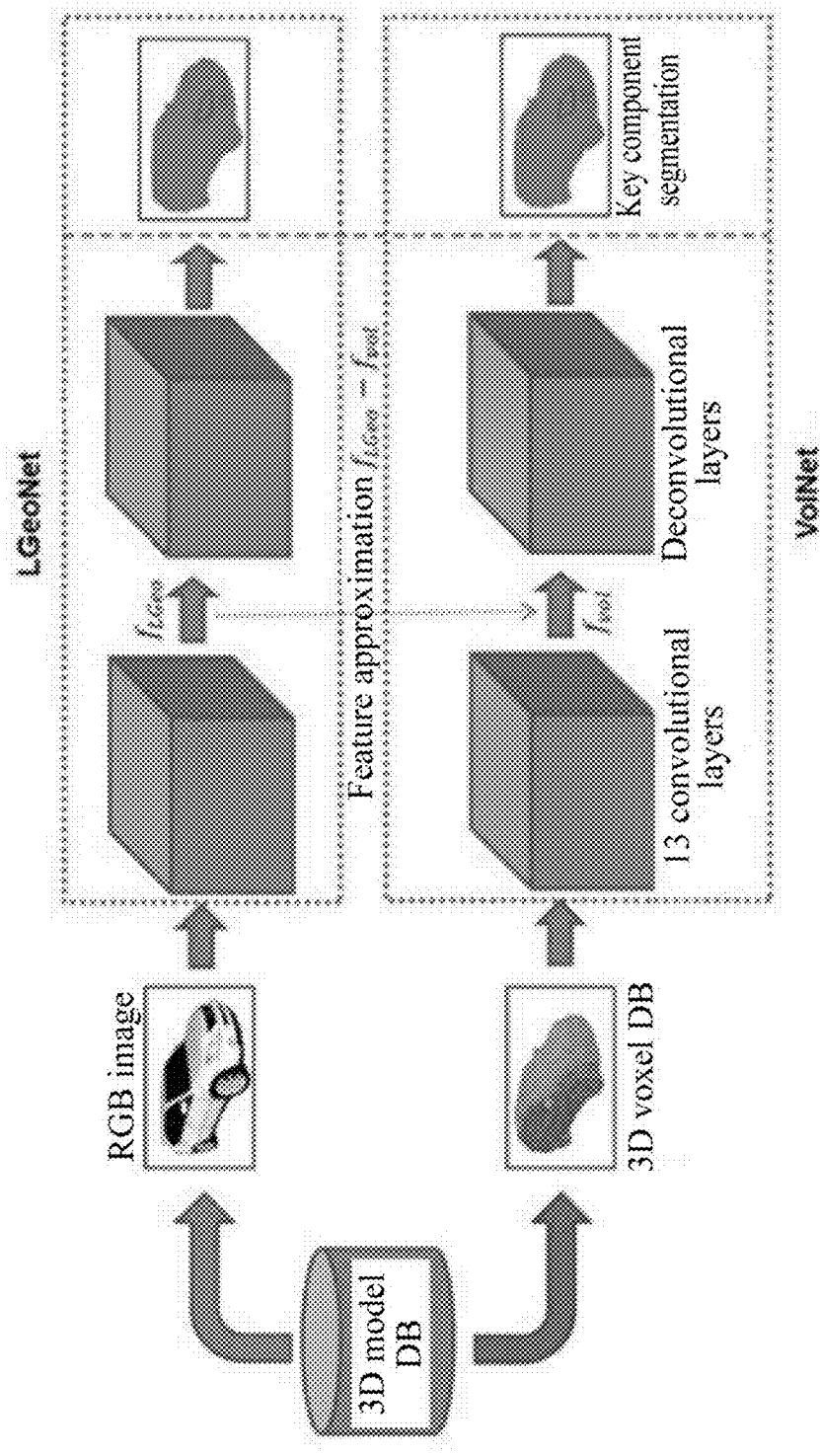
FIG. 6 illustrates an example of a deep learning network for estimating a 3D pose of an object.

FIG. 6 illustrates an example of a deep learning network for estimating a 3D pose of an object.

FIG. 6 illustrates another example of a process of training a deep learning network that extracts a local geometric feature. The local geometric feature is extracted through a network model obtained by training of FIG. 6.

Referring to FIG. 6, a deep learning network VolNet is trained first. Input data includes 3D voxel data generated (or stored) from a 3D model database. For example, the 3D voxel data is 3D depth data.

The input data is processed through convolutional layers, e.g., 13 convolution layers where a 13-layer convolution operation is performed on the input data; however, the number of convolution layers is not limited thereto. A feature $f_{vol}$ is obtained.

In this example, the size of the input data is [64, n, 224, 224], where 64 denotes the batch size; n denotes the number of 3D voxel data channels; and each of the 224s denotes the height and the width of the input data.

The size of a convolutional kernel is 3×3, for example, where the step size is set to "1", and an edge expansion value is "1". A convolution operation is performed on the convolutional kernel and the input data, and a number of output channels correspond to a number of neurons of a current convolutional kernel.

The feature map, on which the convolution operation is performed, is processed by a ReLU function which is a non-linear activation function. Each time a second, fourth, seventh, tenth, or thirteenth convolution operation is performed, the feature map is downsampled, and a pooling operation is set. A pooling window size is set to 2×2, and a pooling step length is set to "2". A non-overlapping maximum pooling operation is performed on the image.

A deconvolution operation is performed on a feature $f_{vol}$ to output an object key component information. Deconvolution is a reverse process of convolution and referred to as a transposed convolution. Deconvolution enables upsampling of the image (or feature map). After the deconvolution operation is performed, object key component information of the same width and height as the input image are generated as an output.

Next, a deep learning network LGeoNet is trained. Input data is a color or monochrome image (for example, an RGB image) generated (or stored) from a 3D model database. For example, 3D voxel data is 3D depth data.

A 13-layer convolution operation is performed on the input data, and an image local geometric feature $f_{LGeo}$ is obtained.

Here, a size of the input data, that is, the input image, is [64, 3, 224, 224]. For example, 64 denotes a batch size, 3 denotes the number of channels, and 224s denotes a height and a width of the input image.

A size of a convolutional kernel is 3×3, a step size is set to "1", and an edge expansion value is "1". A convolution operation is performed on the convolutional kernel and the input data, and a number of output channels correspond to a number of neurons of a current convolutional kernel.

A feature map on which the convolution operation is performed is processed by a ReLU function which is a non-linear activation function. Each time a second, fourth, seventh, tenth, or thirteenth convolution operation is performed, the feature map is downsampled, and a pooling operation is set. A pooling window size is set to 2×2 and a pooling step length is set to "2", in this example. A non-overlapping maximum pooling operation is performed on the image.

A deconvolution operation is performed on a feature $f_{LGeo}$, and object key component information is output.

A feature approximation strategy is also used for the process of training the deep learning network LGeoNet. That is, the feature approximation strategy enables the image feature $f_{LGeo}$ obtained by the deep learning network LGeoNet and the feature $f_{vol}$ obtained by the deep learning network VolNet to be maximally matched. By adding a single auxiliary loss term $loss_{LGeo} = f_{LGeo} - f_{vol}$ to a loss function, the image feature $f_{LGeo}$ is enabled to constantly approach $f_{vol}$ when the network is trained. In the training process, parameters of the network model $Model_{vol}$ do not change and are only used to assist training of the deep learning network LGeoNet.

Unlike the 3D pose estimating method described with reference to FIGS. 3 through 6, the 3D pose of an object is estimated by extracting a global visual feature of an image using only the deep learning network GAppNet or by extracting a local geometric feature of an image using only the deep learning network LGeoNet. In another example, the 3D pose of the object is estimated using a combination of the two networks. The aforementioned examples will be described with reference to FIGS. 7 through 9.

Figure 7:
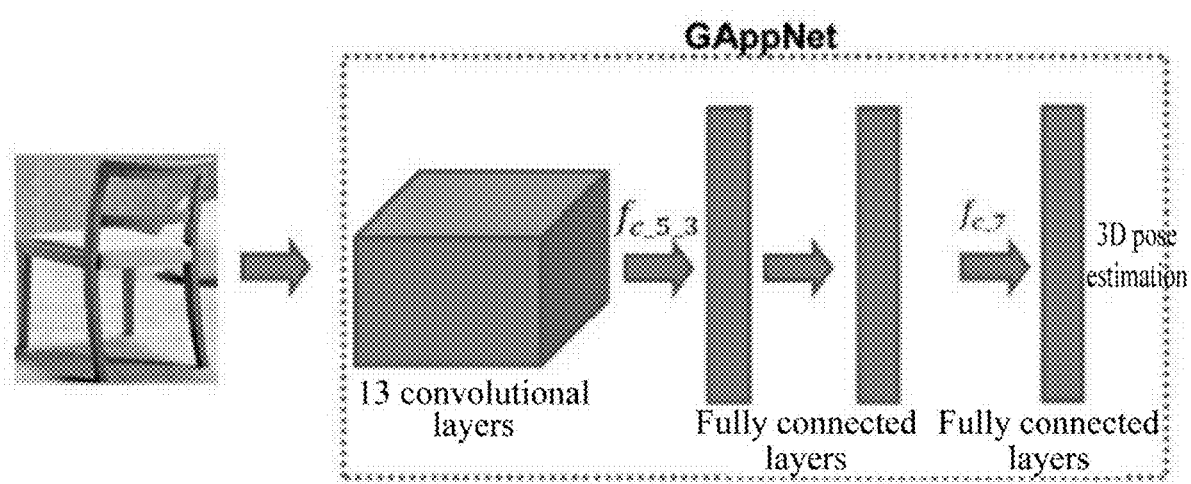
FIG. 7 illustrates an example of a deep learning network for estimating a 3D pose of an object.

FIG. 7 illustrates an example of a deep learning network for estimating a 3D pose of an object.

Referring to FIG. 7, a 3D pose of an object is estimated by extracting a global visual feature of an image using only a deep learning network GAppNet.

Input data is a color image and input into the network GAppNet. A feature $f_{c\_7}$ is obtained by the already trained deep learning network model GAppNet. A single-fully connected layer operation is performed on the feature $f_{c\_7}$, and a 3D pose of an object is estimated.

In a case of estimating the 3D pose of the object using only the deep learning network GAppNet, an output from an output layer is the 3D pose of the object, and thus a separate training network is unnecessary.

Figure 8:
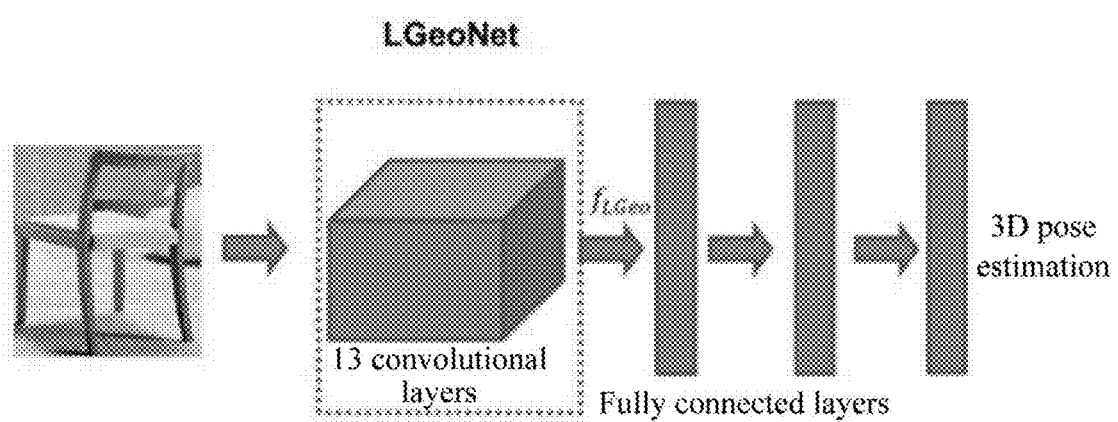
FIG. 8 illustrates an example of a deep learning network for estimating a 3D pose of an object.

FIG. 8 illustrates an example of a deep learning network for estimating a 3D pose of an object.

Referring to FIG. 8, a 3D pose of an object is estimated by extracting a local geometric feature of an image using only a deep learning network LGeoNet.

In this example, the input data is a color image that is input into the network LGeoNet. The deep learning network model LGeoNet is trained through a 13-layer convolution operation and a local geometric feature $f_{LGeo}$ is obtained through the trained network model LGeoNet.

The local geometric feature $f_{LGeo}$ is used as an input of a subsequent network, and a 3D pose of an object is output through three fully connected layers.

In a case of estimating the pose of the object using only the deep learning network LGeoNet, an output from an output layer of the network is a key component or key part of the object, and thus additional training is needed to estimate the pose of the object.

In the above training process, a learning rate of the network structure that extracts the local geometric feature is "0". That is, network parameters do not change and are only used to assist training of the network LGeoNet.

Figure 9:
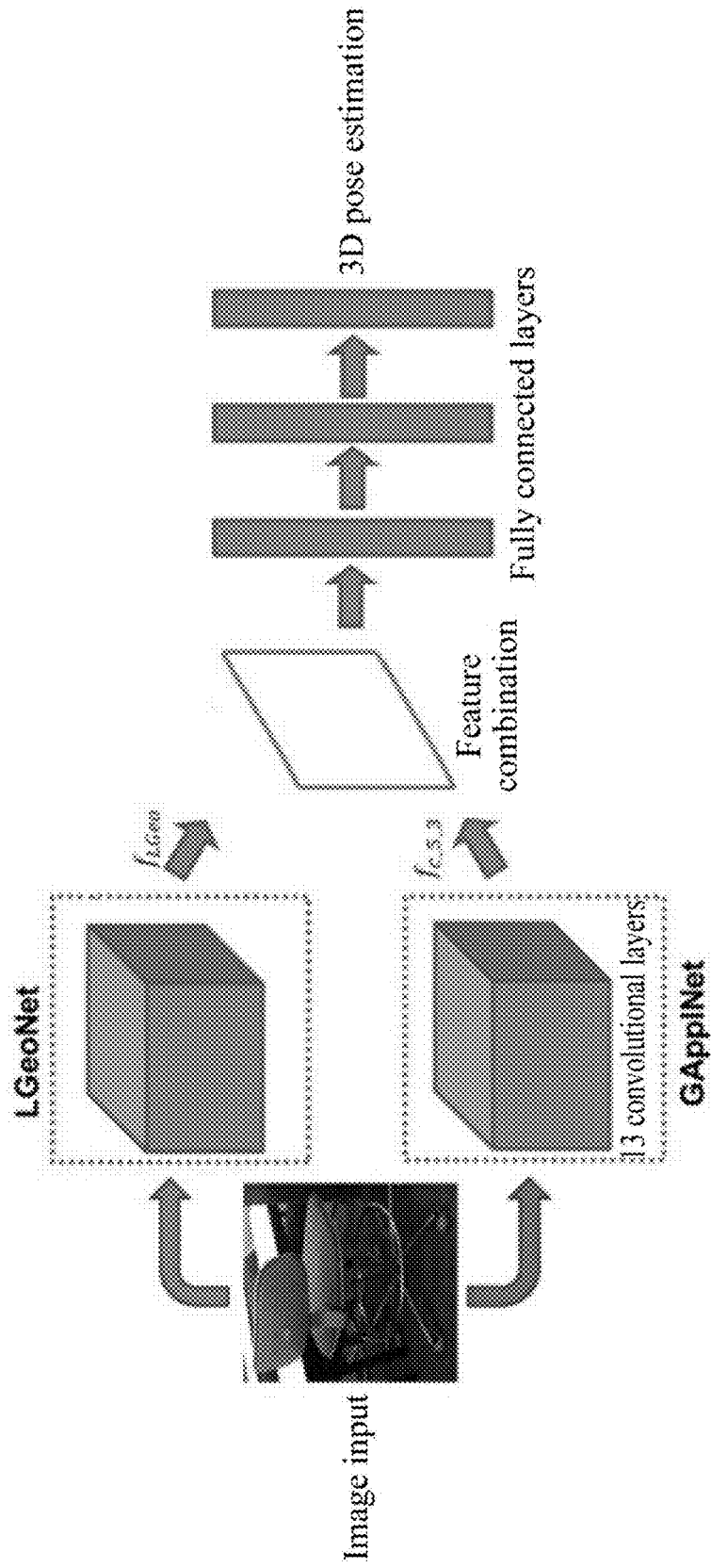
FIG. 9 illustrates an example of a deep learning network for estimating a 3D pose of an object.

FIG. 9 illustrates an example of a deep learning network for estimating a 3D pose of an object.

Referring to FIG. 9, a 3D pose of an object is estimated by combining a global visual feature and a local geometric feature of an image based on deep learning. In a case of combining the global visual feature and the local geometric feature of the image based on deep learning to estimate the 3D pose of the object, the two features need to be combined into a new feature, and thus additional training is required for estimating the 3D pose of the object.

In response to a color image being input, deep learning network models GAppNet and LGeoNet are trained through a 13-layer convolution operation, for example. A global visual feature $f_{c\_5\_3}$ and a local geometric feature $f_{LGeo}$ are obtained by the trained network models GAppNet and LGeoNet.

Features at positions corresponding to the global visual feature $f_{c\_5\_3}$ and the local geometric feature $f_{LGeo}$ are summed up to obtain a total feature f.

A three-fully connected layer operation is performed on the feature f, and a 3D pose of an object is output.

In a case of combining the global visual feature and the local geometric feature of the image based on deep learning to estimate the 3D pose of the object, the two features need to be combined into a new feature, and thus additional training is required for estimating the 3D pose of the object.

In the above training process, the learning rate of the network structure (or convolutional layer) that extracts the global visual feature and the local geometric feature is "0". That is, network parameters of GAppNet and LGeoNet do not change, and only network parameters of three fully connected layers change.

The 3D pose information of the object estimated as in FIGS. 2 through 9 is used to calculate a depth image. For example, a dense depth image corresponding to the object is determined based on the 3D pose of the object. A method and apparatus for acquiring a depth image will be described with reference to FIG. 10.

Figure 10:
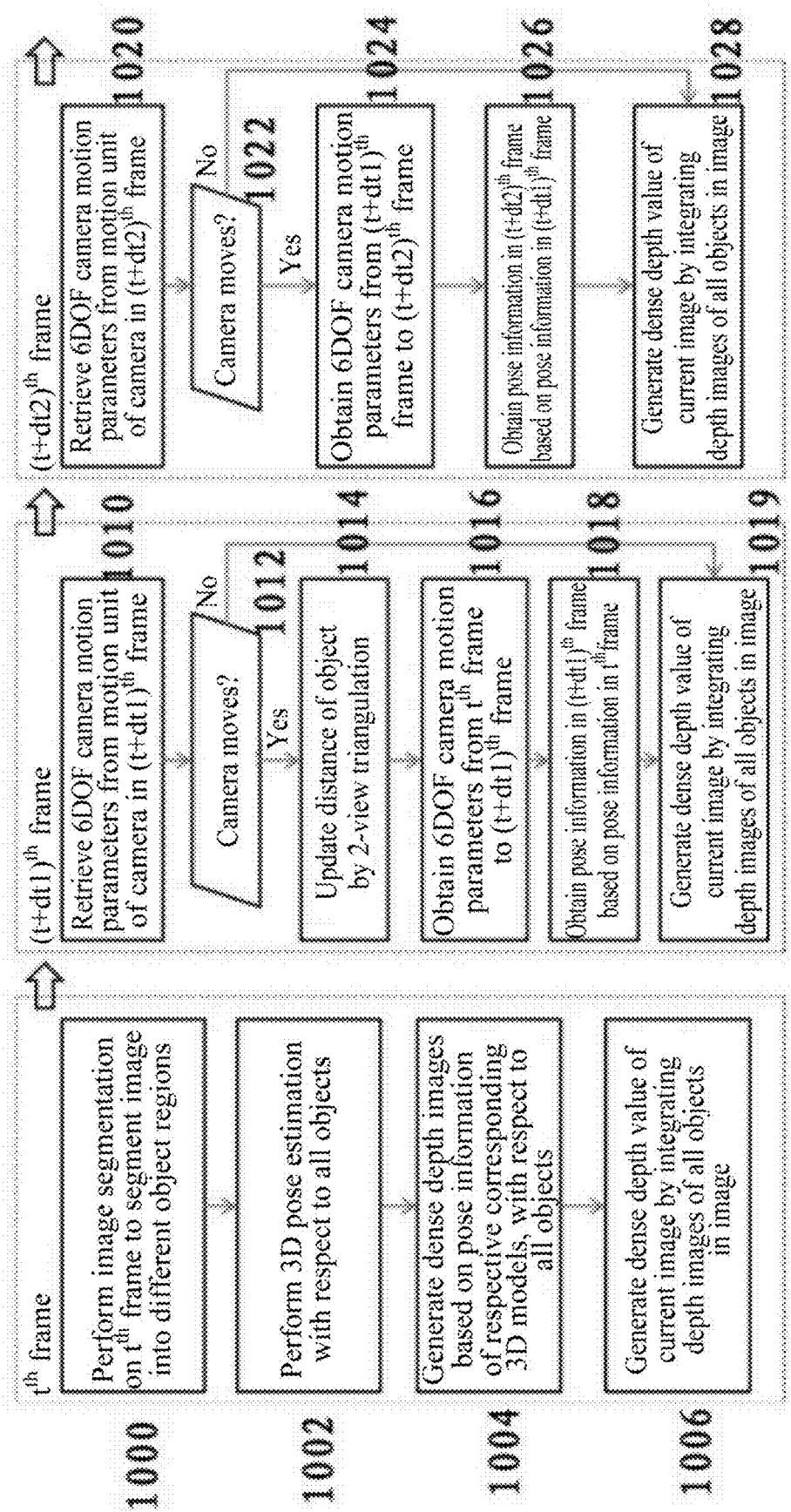
FIG. 10 is a flowchart illustrating an example of generating a depth image based on a 3D pose of an object.

FIG. 10 is a flowchart illustrating an example of generating a depth image based on a 3D pose of an object.

In FIG. 10, it is assumed for ease of description that a $t^{th}$ frame through a $(t-dt2)^{th}$ frame are used to generate a depth image.

The following operations are performed for the $t^{th}$ frame.

In operation 1000, image segmentation is performed on the $t^{th}$ frame to segment an image into different object regions. That is, object region segmentation is to be performed on a 2D image to generate 2D images corresponding to objects.

In operation 1002, 3D pose estimation is performed with respect to each segmented object.

In operation 1004, dense depth images are generated with respect to all the objects from respective corresponding 3D models and estimated pose information.

In operation 1006, the dense depth images of all the objects are integrated (or assembled) to generate a dense depth value of a current image (the entire image).

The following operations are performed for the $(t+dt1)^{th}$ frame.

In operation 1010, motion parameters of a 6DOF camera are retrieved.

In operation 1012, whether the camera moves is detected. In a case in which the camera does not move, an image depth map does not change, and thus operations 1014 through 1018 are skipped, and operation 1019 is performed. In a case in which the camera moves, operations 1014 through 1019 are performed.

In operation 1014, a distance of an object is updated by 2-view triangulation.

In operation 1016, motion parameters of the camera from the $t^{th}$ frame to the $(t+dt1)^{th}$ frame are obtained.

In operation 1018, object pose information in the current frame is calculated based on the object pose information in the $t^{th}$ frame and the motion parameters of the camera.

In operation 1019, a dense depth value in the current $(t+dt1)^{th}$ frame is obtained based on the object pose in the current frame, and a depth map in the current $(t+dt1)^{th}$ frame is generated.

For the $(t+dt2)^{th}$ frame, operations 1020, 1022, 1024, 1026 and 1028 respectively corresponding to operations 1010, 1012, 1016, 1018 and 1019 are performed.

Through the above method, a depth image is acquired. To acquire a dense depth image, the corresponding 3D model is inversely projected to the image based on the 3D pose information.

The above 3D pose estimating and depth image acquiring method is applicable to fields such as augmented reality, autonomous vehicles and smart home robots.

The pose estimating apparatus 10, and other apparatuses, units, modules, devices, and other components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that performs the operations described in this application is performed by computing hardware, for example, by one or more processors or computers, implemented as described above executing instructions or software to perform the operations described in this application that are performed by the method. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented pose estimating method, comprising:
   acquiring a two-dimensional (2D) image corresponding to an object;
   extracting a global visual feature and a local geometric feature of the object in the 2D image; and
   estimating a three-dimensional (3D) pose of the object based on the global visual feature and the local geometric feature,
   wherein the extracting comprises:
      extracting a first feature based on the 2D image and depth information of the 2D image;
      extracting a second feature based on the 2D image; and
      extracting the global visual feature by applying a feature approximation strategy to the first feature and the second feature.

2. The pose estimating method of claim 1, wherein the global visual feature is a visual feature of the object in its entirety and the local geometric feature is a geometric feature of a portion of the object.

3. The pose estimating method of claim 2, wherein another portion of the object in the geometric feature is occluded or truncated.

4. The pose estimating method of claim 1, wherein the acquiring comprises acquiring the 2D image by performing object region segmentation on an image.

5. The pose estimating method of claim 1, wherein the local geometric feature includes a local key component of the object or a key point of the object.

6. The pose estimating method of claim 1, wherein the extracting comprises:
   extracting the global visual feature of the 2D image through a first deep learning network; and
   extracting the local geometric feature of the 2D image through a second deep learning network.

7. The pose estimating method of claim 6, wherein the extracting of the global visual feature through the first deep learning network comprises:
   training a third deep learning network based on the 2D image and the depth information of the 2D image; and
   applying the feature approximation strategy to the first deep learning network based on the 2D image and an output of the third deep learning network.

8. The pose estimating method of claim 7, wherein the applying comprises:
   calculating a loss term which is a difference between a feature obtained from the first deep learning network and a feature obtained from the third deep learning network; and
   approximating the feature obtained from the first deep learning network to the feature obtained from the third deep learning network based on the loss term.

9. The pose estimating method of claim 6, wherein the extracting of the local geometric feature through the second deep learning network comprises:
   training a fourth deep learning network based on the 2D image and pixel information of the 2D image; and
   applying a feature approximation strategy to the second deep learning network based on the 2D image and an output of the fourth deep learning network.

10. The pose estimating method of claim 9, wherein the applying comprises:
    calculating a loss term which is a difference between a feature obtained from the second deep learning network and a feature obtained from the fourth deep learning network; and
    approximating the feature obtained from the second deep learning network to the feature obtained from the fourth deep learning network based on the loss term.

11. A processor implemented depth image generating method, comprising:
    acquiring dense depth images corresponding to a plurality of objects based on the 3D pose estimated by the pose estimating method of claim 1; and
    generating a dense depth value of the 2D image by integrating the dense depth images.

12. A pose estimating apparatus, comprising:
a receiver configured to receive an image; and
a controller configured to:
- acquire a two-dimensional (2D) image corresponding to an object from the image,
- extract a global visual feature and a local geometric feature of the object in the 2D image, and
- estimate a three-dimensional (3D) pose of the object based on the global visual feature and the local geometric feature, wherein the controller further configured to:
- extract a first feature based on the 2D image and depth information of the 2D image;
- extract a second feature based on the 2D image; and
- extract the global visual feature by applying a feature approximation strategy to the first feature and the second feature.

13. The pose estimating apparatus of claim 12, wherein the global visual feature is a visual feature of the object in its entirety and the local geometric feature is a geometric feature of a portion of the object.

14. The pose estimating apparatus of claim 13, wherein another portion of the object in the geometric feature is occluded or truncated.

15. The pose estimating apparatus of claim 12, wherein the controller is further configured to acquire the 2D image by performing object region segmentation on the image.

16. The pose estimating apparatus of claim 12, wherein the local geometric feature includes a local key component of the object or a key point of the object.

17. The pose estimating apparatus of claim 12, wherein the controller is further configured to extract the global visual feature of the 2D image through a first deep learning network, and extract the local geometric feature of the 2D image through a second deep learning network.

18. The pose estimating apparatus of claim 17, wherein the controller is further configured to train a third deep learning network based on the 2D image and the depth information of the 2D image, and apply the feature approximation strategy to the first deep learning network based on the 2D image and an output of the third deep learning network.

19. The pose estimating apparatus of claim 18, wherein the controller is further configured to calculate a loss term which is a difference between a feature obtained from the first deep learning network and a feature obtained from the third deep learning network, and approximate the feature obtained from the first deep learning network to the feature obtained from the third deep learning network based on the loss term.

20. The pose estimating apparatus of claim 17, wherein the controller is further configured to train a fourth deep learning network based on the 2D image and pixel information of the 2D image, and apply a feature approximation strategy to the second deep learning network based on the 2D image and an output of the fourth deep learning network.

21. The pose estimating apparatus of claim 20, wherein the controller is further configured to calculate a loss term which is a difference between a feature obtained from the second deep learning network and a feature obtained from the fourth deep learning network, and approximate the feature obtained from the second deep learning network to the feature obtained from the fourth deep learning network based on the loss term.

22. The pose estimating apparatus of claim 12, further comprising:
a depth image generator configured to acquire dense depth images corresponding to a plurality of objects based on the 3D pose, and generate a dense depth value of the image by integrating the dense depth images.

* * * * *